October 18, 1913.

DRAWING 6,891

A careful search has been made this day for the original drawing or a photolithographic copy of the same, for the purpose of reproducing the said drawing to form a part of this book, but at this time nothing can be found from which a reproduction can be made.

Finis D. Morris,
Chief of Division E.

AWK

UNITED STATES PATENT OFFICE.

THOMAS DUGARD, OF NEW YORK, N. Y.

CURVILINEAR SAWMILL.

Specification of Letters Patent No. 6,891, dated November 20, 1849.

*To all whom it may concern:*

Be it known that I, THOMAS DUGARD, of the city, county, and State of New York, have invented certain new and useful improvements in the Curvilinear Sawmill for Sawing Ship and other Timber; and I do hereby declare that the following is a full, clear, and exact description of the principle or character which distinguishes them from all other things before known and of the manner of making, constructing, and using the same, reference being had to the accompaying drawings, making a part of this specification, in which—

Figure 1 is an isometrical perspective view of a saw mill on my improved plan; Fig. 2, a separate view of the saw gate and its appendages; and Fig. 3, a separate view of the upper beam or head of the gate.

The same letters indicate like parts in all the figures.

My improvements relate to that class of saw mills in which the saw is made to vibrate on its axis and to move laterally that it may be guided to cut curved and diagonal lines; and the first part of my invention consists in hanging the saw gate to slide vertically between fender posts connected together and which can be made to slide horizontally to give the lateral movements to the saw by means of rack and pinions connected with a hand wheel within the reach of the attendant. This part of my invention also consists in connecting the pitman or pitmen with the saw gate by means of a horizontal rod or rods attached to the gate which slide in a hole in the end of the pitman or pitmen to allow of the lateral movements of the saw gate, the upper end of the said pitman or pitmen being governed by a guide or guides. And the second part of my invention consists in vibrating the saw by means of a crank handle, or the equivalent thereof, on some stationary part of the frame of the mill by combining this with a pulley (or pulleys), or the equivalent thereof on a rock shaft (or shafts) in the saw gate which slides through the said pulley (or pulleys) by a feather or its equivalent, the said rock shaft (or shafts) being connected with the stirrups of the saw. And this part of my invention also consists in combining a vibrating guide, which embraces the saw and through which it slides, with the rock shaft or shafts that the saw may be guided and kept in the required position near its point of action on the timbers.

In the accompanying drawings (*a*) represents the frame of the mill which may be varied at pleasure, and (*b*) the carriage for carrying the timber to be sawed, operated by rack and pinion (*c*, *d*) and ratchet wheel and feed hand and levers (*e*, *f*) in the same manner as ordinary saw mills.

The saw (*g*) is hung in stirrups (*h*, *h*) which pass through the top and bottom cross-heads (*i*, *i*); they are journaled to the cross heads to turn therein freely but accurately, and are provided each with a plate (*j*) and straining screws (*k*, *k*) for the purpose of straining the saw. To reduce the friction between the plate (*j*) and the cross head friction rollers may be introduced to facilitate the turning of the saw. For the purpose of turning the saw for guiding it, the stirrups are connected on each side with a rock shaft (*l*) (*l*) by means of four chains (*m*, *m*, *m*, *m*) each of them attached by the two ends to one side of the stirrups and passing around a pulley (*n*) on one of the rock shafts. It will be obvious therefore that when either of the rock shafts is turned the saw will turn with it as also the other rock shaft.

The manner of effecting the turning of the saw during its cutting motion is as follows, viz: The rock shafts are either polygons or feathered and slide each through a pulley (*o*) which turns in a framing (*p*) attached permanently to the main frame so that the saw gate can move up and down freely and the pulleys (*o*, *o*) remain stationary and yet when turned communicate that motion to the rock shafts. A chain (*q*) passes from a pulley (*r*) (mounted on the framing (*p*) and operated by a crank handle (*s*)) to one of the pulleys (*o*) and from this pulley (*o*) another chain (*t*) communicates any motion that it may receive from the hand pulley (*r*) to the other pulley (*o*) that both rock shafts may move together. But this chain (*t*) performs another office; it also passes around the periphery of a plate (*u*) which turns in an extension of the framing (*p*), and through a slot (*v*) in which the saw passes; this not only steadies the saw but it guides it near the point of its action on the timber that is being sawed, and insures its taking the proper direction. By this arrangement the direction of the saw is completely under the control of the attendant.

The saw gate ($w$) in which the saw is strained has its cross heads made of plates as represented in the sectional Fig. 3, to make them light, and yet so stiff as to resist the strain of the saw. This gate is provided with four grooved rollers ($x, x, x, x,$) hung in brackets at the back which rollers run on ways ($y, y$) attached to fender posts ($z, z,$) which are framed together and provided with rollers ($a', a', a', a',$) which run between horizontal ways ($b', b'$) so that as the gate moves up and down it can be traversed from side to side that the saw may follow any curve or diagonal to be cut, by simply sliding the fender post frame horizontally between its ways; and to enable the attendant to effect this during the operations of the saw and to have it perfectly under his command one of the fender posts carries a vertical shaft ($c'$) which has a pinion ($d'$) at each end, which pinions engage two permanent racks ($e', e'$). The said shaft also carries a bevel pinion ($f'$) which engages a like pinion ($g'$) on a horizontal shaft ($h'$) provided with a hand wheel ($i'$) so that the attendant by turning the hand wheel can move the fender post frame to the right or to the left and with it the saw gate. And as the hand wheel for moving the saw to the right or to the left is placed near to the crank handle by which the saw is turned during the cutting action of the saw the attendant can guide it accurately along any curved or diagonal line that may be marked on the timber.

The saw receives its up and down cutting motion from two crank pins ($j'$) below, (only one shown in the drawings) and two pitmen or connecting rods ($k'$). The top cross head of the saw gate is of greater length than the width of the gate and extends on each side beyond the side pieces, and under each part so extended is attached a metal rod ($l'$) and to these two rods are jointed the two pitmen or connecting rods, so that the pitmen can retain their position laterally while the gate moves laterally; but to prevent the lateral movement of the gate from being communicated to the pitmen they each slide on a guide rod ($m'$) attached to the frame. The feed motion is communicated to the levers ($f$) by two rods ($n', n',$) jointed to the pitmen, and to the arms ($o' o'$) of a rock shaft ($p'$) which operates the feed levers.

I do not wish to limit myself to the precise arrangement and construction of the various parts, as these may be varied without changing the principle of my invention, as for instance, only one rock shaft may be used for giving the vibratory motions to the saw guide, although I prefer the use of two, and instead of the chains and pulleys, connecting rods jointed to arms may be substituted; but as these variations are familiar to the machinist it is unnecessary to enumerate them.

What I claim as my invention and desire to secure by Letters Patent is—

1. Hanging the saw gate to slide in fender posts framed together and sliding horizontally to give the required lateral movements to the saw, substantially as described, when this is combined by rack and pinion with a shaft and hand wheel, or the equivalent thereof under the control of the attendant, substantially as described.

2. I also claim in combination with the above described method of hanging the saw gate to give it the required lateral movements, connecting the pitman or pitmen with the saw gate by means of a horizontal rod or rods on the saw gate and governing the upper end of the pitman or pitmen by a guide or guides, substantially as described.

3. I also claim the method substantially as herein described of vibrating the saw by means of a rock shaft or shafts connected therewith and hung in the saw gate, in combination with the pulley or pulleys or the equivalent thereof, through which the shaft or shafts slide, as described, the said pulley or pulleys or the equivalent thereof being combined with a crank handle or its equivalent or some stationary part of the framing as described.

4. And finally I claim in combination with the rock shaft or shafts the vibrating saw guide connected therewith, substantially in the manner and for the purpose specified.

THOMAS DUGARD.

Witnesses:
ALEX. PORTER BROWNE,
GEORGE COLYER.